June 14, 1938.  C. S. CHAUSSÉ  2,120,729
PROCESS AND DEVICE FOR AUTOMATICALLY CENTERING X-RAYS IN
RADIOGRAPHIC AND STEREOSCOPIC RADIOGRAPHIC APPARATUS
Filed March 11, 1937  2 Sheets-Sheet 1
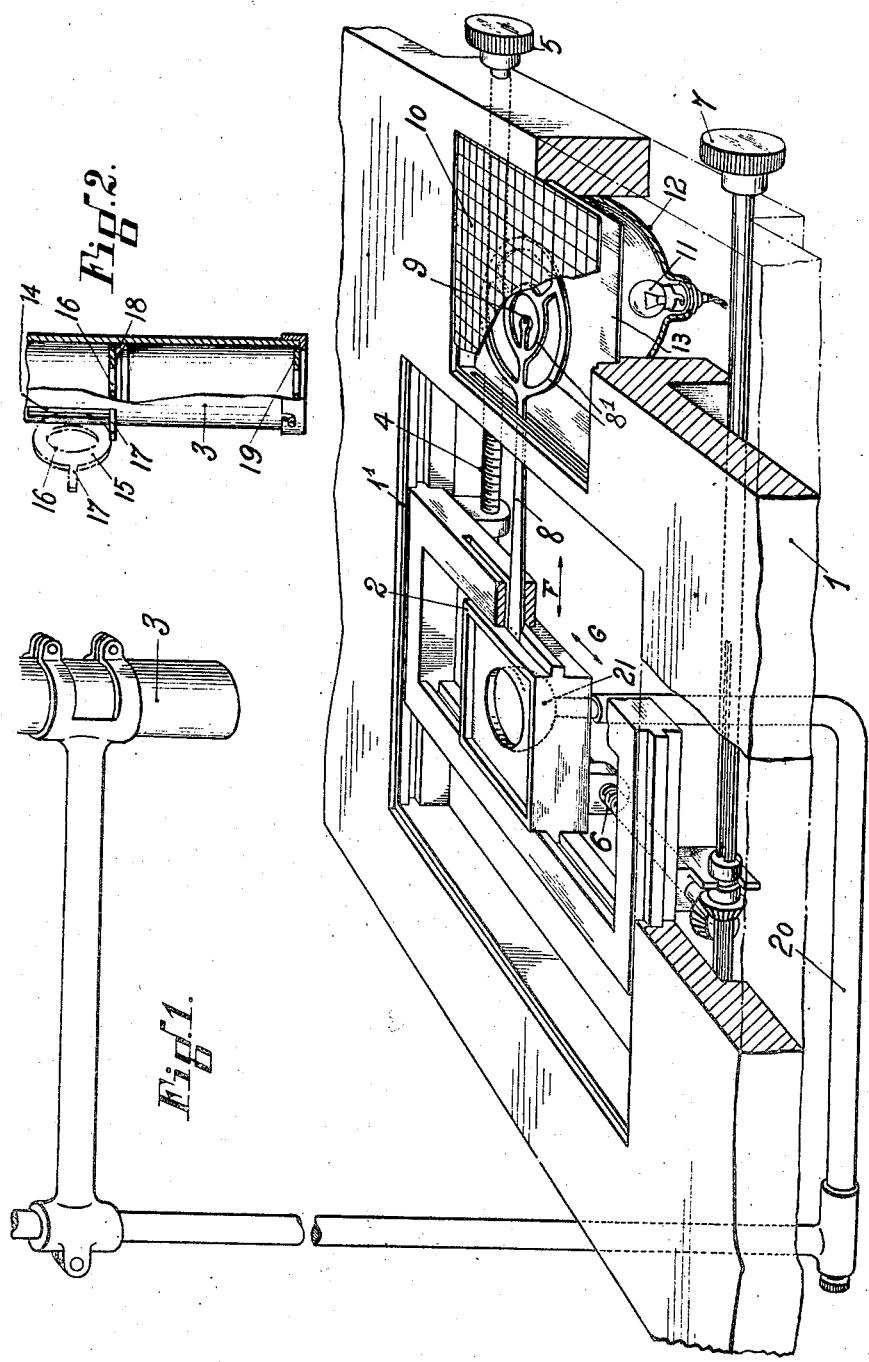
Inventor
CLÉMENT SYLVAIN CHAUSSÉ
By
Young, Emery & Thompson
Attorneys

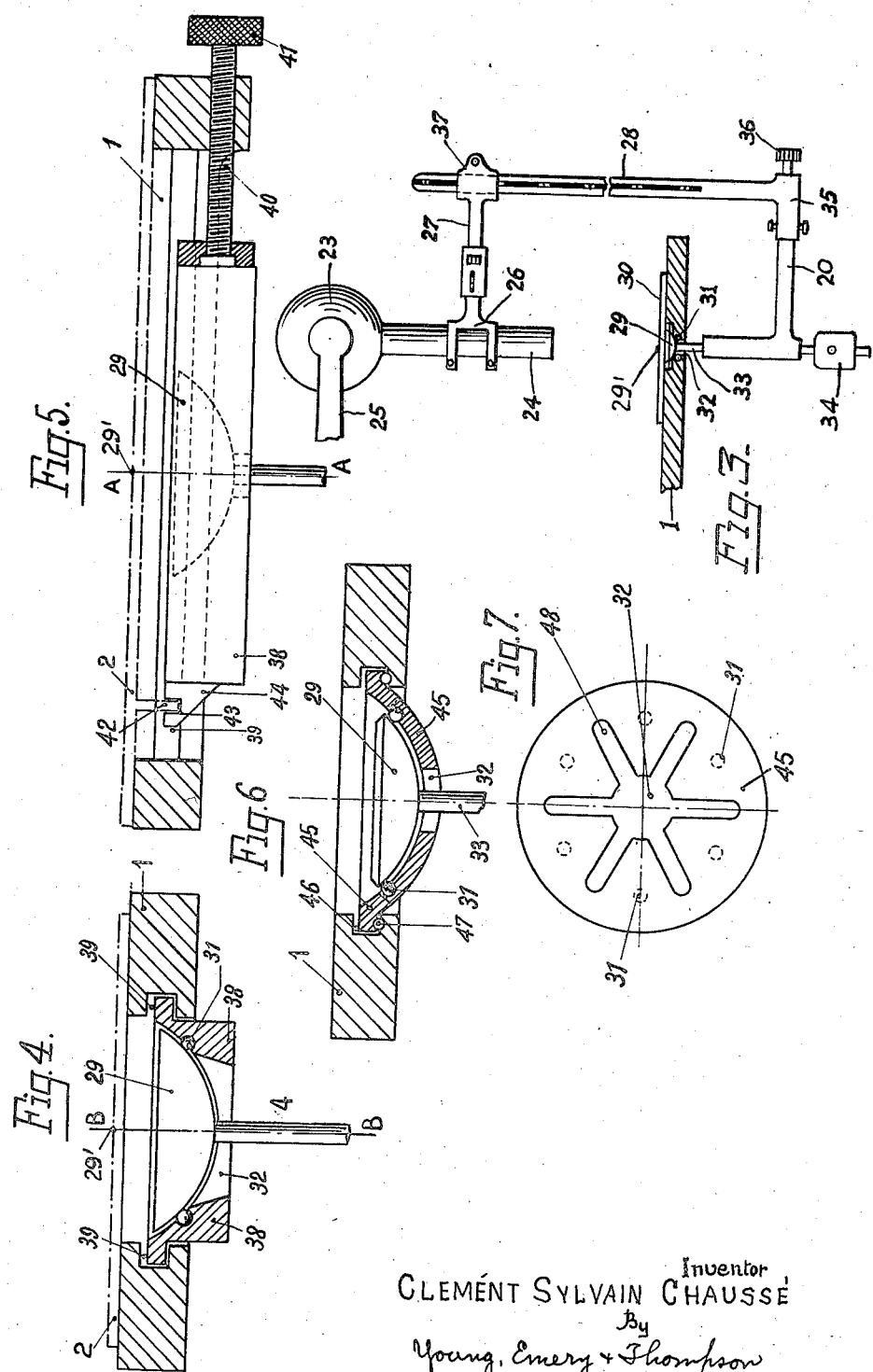

Patented June 14, 1938

2,120,729

UNITED STATES PATENT OFFICE 2,120,729

PROCESS AND DEVICE FOR AUTOMATICALLY CENTERING X-RAYS IN RADIOGRAPHIC AND STEREOSCOPIC RADIOGRAPHIC APPARATUS

Clement Sylvain Chaussé, Paris, France

Application March 11, 1937, Serial No. 130,374
In France March 14, 1936

9 Claims. (Cl. 250—34)

The present invention relates to radiography and has for its object to provide a process and apparatus for obtaining perfectly centered and localized proofs and which are applicable in particular to stereoscopic radiography.

This process consists in guiding the localizing tube of the X-ray tube in such a way that the pencil of rays, whatever the position and orientation of the tube, passes by the central point of a mobile device carrying the sensitive film, the said mobile device being able to perform, with respect to the operating table, linear movements in two mutually perpendicular directions, the movements being determined by adjustment on a suitable adjusting plate.

The centering point of the pencil of X-rays on the movable device which carries the sensitive film is on the sensitive layer of the film as with certain known apparatuses. The transfer movements are effected in the direction of the longitudinal and transverse axes of the operating table. The localizing tube is thus actuated in such a way that the field of the pencil of X-rays can be varied as desired.

More specifically, the process according to the invention consists in effecting successively the following operations:—

1. A first rough radiograph is made, if necessary on a large scale, using a large field of the pencil of X-rays.

2. This radiograph is developed.

3. The developed radiograph is placed on the adjusting device of the operating table and the control of the mobile member carrying the sensitive film is displaced so as to direct it to the subject to be examined, which has the effect of displacing the mobile element by the amount necessary to direct the point of impingement of the pencil or rays on to the said subject to be examined.

4. One or more positive radiographs of the subject to be examined are made with a reduced field of the pencil of X-rays, if necessary with the time-exposure correction shown by the development of the rough radiograph.

This method of operation has the advantage of assuring automatic and positive centering on the subject to be examined: it permits of the use of films of small size (in particular 9x12 cm.) for positive radiographs, thus effecting a substantial economy in the film. The clarity of the radiograph obtained is moreover increased, which enables them to be read more easily and gives particularly legible stereoscopic radiographs.

The rough radiographs, taken if necessary on a stereoscopic plate of large size, removes the risks of errors resulting from too narrow localization.

It will be understood, however, that the rough stereoscopic plate has two objects: firstly, it permits more precise localization for positive radiographs and secondly, it enables the correct time exposure for the said positive radiographs to be calculated. Thus the time required by the preparatory operations for taking positive radiographs is not longer than in the normal practice which also requires the taking of a preparatory stereoscopic plate in order to assess the correct time exposure.

This process, giving exact and automatic centering of the pencil of X-rays, can be used without preparation by any operator, even if inexperienced, with complete success. It may, moreover, be applied by means of apparatus according to the invention which will be described hereafter and which may be easily and interchangeably applied to any existing apparatus without requiring the use of any unusual or expensive tools.

This device permits effecting the desired centering automatically. It is characterized in that the X-ray tube is guided in its movements by a frame with three articulated sides jointed to the examination table by means of a ball and socket joint having a hemispherical head the pivoting centre point of which is on the sensitive face of the plate or film. The ball and socket joint is preferably mounted with the interposition of ball bearings on a spherical seat or on a rolling track provided in the operating table or in a part integral with the latter.

With this device the pivoting centre which is the centre of the sphere of the ball and socket is on the sensitive face of the sensitive film whatever the inclination given to the emitting tube.

This device permits of obtaining radiographs at different angles very rapidly and accurately which by restoration, makes it possible to obtain stereoscopic radiographs enabling the part examined to be easily localized.

The device according to the invention is easily adapted on to the localizing tube of the X-ray tube or on its carrying cup. It may slide on the latter in accordance with the movements of the tube whilst giving a controlled orientation to the latter towards the centre of the ball and socket joint. This device can thus be adapted to any existing apparatus without involving any mechanical complications.

Finally the device according to the invention has the advantage of suppressing vibration of the emitting tube, which increases the clearness of the radiograph obtained. The latter may be obtained on plates or films of very small dimensions.

When the organ to be radiographed is internal and is sufficiently far away from the examination table and, consequently, the sensitive film, in order to maintain the said organ constantly in the field of the pencil of X-rays, the seating of the ball and socket joint is made to slide transversely with respect to the examination table. The displacement of this seating is obtained for example by means of a screw. A correction of the position of the pencil is obtained. As the tube rests in this fixed position the pencil of X-rays is directed exactly on the subject to be observed, by the displacement of the seating which effects a slight angular displacement of the tube about the point where it is fixed by its support.

In a modification the spherical head is mounted on a support capable of giving a rotary movement with respect to the operating table. The said rotary support is preferably mounted with the interposition of ball bearings. This arrangement facilitates the guiding of the pencil emitted by the tube.

In the support of the spherical head radial slots are provided in which the pin fixed with the head can engage, thus enabling greater angles to be given to the radiographic device. The radiographic device can thus receive greater inclinations, the pin being able to deviate more from the vertical axis.

Moreover, the casing carrying the sensitive film is given a linear movement in the direction of the main axis of the operating table and to the latter is added an adjusting device reproducing the movements of the said support.

Provision is likewise made for providing on the localizing tube a certain number of diaphragms enabling the field of the pencil of X-rays to be conveniently regulated.

The adjusting device may likewise comprise a circular plan corresponding to the different diaphragms of the localizing tube.

The process and device will be more particularly described with reference to the accompanying drawings by way of example and in which:—

Figure 1 is a perspective view of the operating table used for carrying out the process.

Figure 2 is a sectional elevation of the localizing tube with the field regulating device.

Figure 3 is the assembly of the device for guiding the radiographic tube.

Figure 4 is a sectional view of the device with the sliding support, the section being on the line A—A of Fig. 5.

Figure 5 is a section on the line B—B of Fig. 4.

Figure 6 is a sectional view of a modification and

Figure 7 is an inverted plan of Fig. 4.

The operating table 1 (Fig. 1) which may be formed of one or more inclinable parts comprises an opening 1', in the operating zone receiving a mobile element 2 disposed vertically below the median position of the X-ray tube and localizing tube 3. The mobile element 2 carries the casing (not shown) containing the sensitive plate or film. It may have a linear movement transversely to the table in the direction of the arrow F under the action of the screw 4 operated by the knob 5 or any other suitable means. It may also have a linear movement in the longitudinal direction of the table according to the arrow G by means of the control knob 7 or other suitable device operating the screw 6.

The opening 1' comprises a frame capable of receiving a frame supporting a plate of large size, not fixed to the mobile assembly and used for taking original rough radiographs.

On the mobile element 2 there is fixed an index 8 the extremity 9 of which may be displaced opposite the adjusting device 10. This adjusting device is preferably formed of a sheet of glass mounted in a groove in the table 1 and having graduations in the direction of the longitudinal and transverse axes of the table engraved on its lower face, these graduations likewise serving to divide the glass sheet up into sections. In the example shown the index 8 is also provided with a series of circles 8' corresponding to the diaphragms of the localizing tube. The plate is transparently illuminated by means of any convenient device for example a lamp 11 with a reflector 12 and a sheet of ground glass 13.

The index could also comprise a transparent plate integral therewith carrying a tracing of the circles corresponding to the different diaphragms and sliding underneath the graduated glass sheet.

The localizing tube 3 (Fig. 2) comprises at its upper extremity a longitudinal slot 14 which can receive a disc 15, perforated with a calibrated hole 16 and provided with a pin 17. In order to regulate the field of the localizing tube a disc having a suitable opening 16 is introduced into the slot 14 and after introduction into the tube is subjected to a rotation of 90° until it rests on the support 18.

The lower end of the tube can also receive removable diaphragms of different sizes such as 19 and which cooperate with the diaphragm 15 to limit the cone or the cylinder forming the pencil of X-rays. These lower diaphragms are interchangeable by means of a suitable mounting, for example, a bayonet clip.

The localizing tube is connected to the mobile element 2 of the operating table 1 by a guiding device 20. The latter is shown as formed by a frame with three arms of which the end 21 can turn in a ball and socket joint the socket of which is integral with the element 2. A particular form of construction of this device will be described in detail hereafter.

In addition there may also be provided an optical illuminating system (bulb, reflector, and lenses, for example), emitting a pencil of light rays along the axis of the tube 3 and leaving by an orifice provided in the table supporting the patient (not shown). This pencil of light rays shines on the body of the patient at the exact point of discharge of the X-rays, thus facilitating regulation. This ray forms to a certain extent the fourth side of the tube-carrying frame.

The operation of the process according to the invention is as follows:—

*First operation—anatomical centering*

The patient being placed on the operating table, the localizing tube of the X-ray tube is directed in the required direction by means of adjusters or anatomical plans, using if necessary the luminous regulating apparatus previously described. In this operation the localizer is provided with a sufficiently large field. A first rough radiograph, if necessary on a large scale is now taken whilst maintaining the end 9 of the index 8 at the centre of the regulating device 10. The radiograph thus obtained is developed.

Second operation

The radiograph having been developed, the patient remaining in position on the operating table during development, which lasts about 10 minutes, the wet film is now placed on the graduated sheet of glass 10 so that the centre of the image coincides with the centre of the adjusting device, an operation which is facilitated by the outline provided on the glass sheet.

The end 9 of the index 8 is now directed on to the part which is to be specially examined, whilst using the screws 4 and 6, that is, the geometrical coordinates of the organ to be examined are marked with this index. In this way a positive anatomical-geometrical centering of the pencil of X-rays is obtained.

With this adjustment the X-ray tube can thus be oriented in any direction, the localizing tube always being guided with respect to the centre of the mobile element 2 and the point of discharge of the pencil of X-rays will always pass to the centre of the latter. In this way, without moving the patient, a radiograph of the object to be examined, or several exactly centred radiographs are automatically obtained on the film carried by the element 2.

The operation of centering just described takes a few minutes.

For the positive radiograph or radiographs thus obtained it will be of advantage to reduce the field of the localizer by modifying the diaphragms of the latter, the circles 8' carried by the index 8 giving directly the optimum diaphragm. Also by means of the development of the rough print the necessary corrections in the time exposure can be effected.

In this way perfectly clear radiographs automatically including the part to be examined are obtained.

By making successive radiographs at different angles it is easy to obtain stereoscopic radiographs of a certain organ.

The mounting and oscillation device of the X-ray apparatus is effected as follows, in the example shown in Figs. 3, 4, 5, 6 and 7.

The X-ray emitting tube is shown at 23 in Fig. 3. It comprises a cylindrical localizing tube 24. The tube 23 is supported by an arm 25 which may be oriented in all directions and is fixed to a maneuvering apparatus (not shown). On the localizing tube there is mounted a bridge 26, capable of sliding and turning on the latter, with three arms 26, 27 and 28 connecting it to the examination table 1. It will be understood that any other means for connecting the frame with respect to the tube carrier may be provided. The connection of this frame with the examination table 1 is obtained by a ball and socket joint 29, the pivoting centre 29' of which is by construction situated on the centre of the sensitive plate or film 30 (enclosed in a casing). The ball and socket joint 29 pivots with the interposition of ball bearings 31 in a spherical seating or the like integral with the table 1, presenting an orifice 32 to the lower part. The pin 33 fixed to the ball of the joint 29 passes freely through this orifice and is fixed at the other end to the movable frame 26, 27, 28.

The frame is formed of the part 26 provided with a stabilizing counter-poise 34 and on which the sleeve 35 can be mounted, retained in the required position by a screw 36 and connected to the arm 28. On this arm 28 there is mounted by the sleeve 37 the arm 27 carrying the bridge 26.

The different members being conveniently adjusted on the mounting, it will be understood that it will be possible to give any suitable orientation to the supporting assembly for different cases by pivoting at the joint 29, with the point 29', defined previously, as centre. The operator can thus always be sure that the pencil of X-rays will be centred at 29' whatever the orientation given to the tube 23. This device permits the use of plates or films of very small size without the fear of failures and facilitates very localized stereoscopic radiography or stereoscopic radiography as the regulation for the second radiograph is effected automatically.

The adjustments will be facilitated by the fact that the carriage and the members which support the X-ray tube, not shown, independently of their rotary movement will be movable in two directions perpendicular and parallel to the axes of the divisions of the plate 10.

In Figs. 4 and 5 the spherical head 29, instead of being placed in a socket in the operating table 1 is mounted—with the interposition of ball bearings 31—in a support 38. This support 38 can slide in grooves 39 provided in the table 1. The support 38 is actuated by means of a screw 40 passing in a hole screwed in a ledge of the table 1, and is operated by any suitable means, for example a knurled head 41.

In turning the knurled head 41 the support 38 is displaced to a suitable degree and consequently the pivoting centre 29' is directed to any desired point of the sensitive plate or film 30. During this operation the X-ray tube remains fixed but the localizing tube may be slightly inclined, leading the pencil into the field of the organ to be studied, the centering remaining secure.

In addition means can be provided connecting the casing carrying the sensitive film 30 to the support 38 so that the linear displacements of the support 38 are transmitted to the film 30.

According to one form of construction, the casing containing the film is formed of a frame provided with tenons 42. These tenons 42 engage in a recess 43 of an extension 44 integral with the support 38.

This means is merely given by way of example. It may be replaced by any other suitable means such as pins, grips, balls pushed by springs and the like.

In a modification (Fig. 6) the ball of the joint 29 is mounted in a spherical socket 45 the edge of which slides in an annular groove 46 of the table 1. The edge is preferably mounted in the groove 46 with the interposition of ball bearings 47.

In order to enable the pin to be inclined at greater angles than those normally permitted by the orifice 32, a certain number of radial slots 48 are provided. These slots extend in the socket 45 in the spaces between the ball bearings 31. By means of these slots the pin 33 can be deviated much more from the vertical axis.

It will be understood that the device described with a horizontal operating table may also be provided for use vertically, by providing it with compensating and equilibrium devices with counterpoises and chains, cables or return levers.

I claim,

1. A method of X-ray photography comprising the steps of taking an initial rough X-ray picture of larger size than the desired final picture, developing said initial picture while the subject remains posed, determining the localization and centering of the interesting portion of the subject and the time of exposure and density of the negative from the initial picture, and then taking a final smaller sized picture of the interesting portion of the subject.

2. Radiographic apparatus comprising a table for the subject, an X-ray tube arranged over an operating area of said table, a plate holder movable in co-ordinate directions in said operating area below said X-ray tube, means connecting the X-ray tube and said plate holder whereby said tube follows the movements of the plate holder, means enabling a picture of larger size than the plate in said plate holder to be taken of the subject in said operating area, means for fixedly supporting on said table a picture of larger area thus taken, and an index attached to said movable plate holder said index having localizing means corresponding to the field of the smaller plate and overlying the larger picture, the range of movement of said plate holder being such that it can be located with the aid of its index to take a picture of the subject corresponding to the region defined by said localizing means on the larger picture.

3. Apparatus according to claim 2 in which the X-ray tube has localizing means and means for changing the area of the diaphragm aperture for the pencil of emitted X-rays, the localizing means of the index having concentric circles corresponding to different apertures.

4. Apparatus according to claim 2 comprising two manually operable adjustment devices for moving the plate holder in rectangular co-ordinate directions, the support for the larger picture having corresponding graduations over which the index localizing means moves.

5. Apparatus according to claim 2, in which the support for the larger picture comprises a transparent plate arranged in front of the index, picture holding means on the front of the transparent plate, and an illuminating device behind the index and transparent plate.

6. Apparatus according to claim 2, in which the means connecting the X-ray tube and the movable plate holder include a ball and socket joint the center point of pivoting of which always lies in the plane of the sensitized film of a plate in the plate holder.

7. Apparatus according to claim 2, in which the means connecting the X-ray tube and the movable plate holder include a ball and socket joint the center point of pivoting of which always lies in the plane of the sensitized film of a plate in the plate holder and at the center point of said film.

8. Radiographic apparatus comprising a table for the subject, an X-ray tube arranged over an operating area of said table, a plate holder movable in co-ordinate directions in said operating area below said X-ray tube, means connecting the X-ray tube and said plate holder whereby said tube follows the movements of the plate holder, means enabling a picture of larger size than the plate in said plate holder to be taken of the subject in said operating area, means for fixedly supporting on said table a picture of larger area thus taken, an index attached to said movable plate holder, said index having localizing means corresponding to the field of the smaller plate and overlying the larger picture, the range of movement of said plate holder being such that it can be located with the aid of its index to take a picture of the subject corresponding to the region defined by said localizing means on the larger picture, and means for effecting a relative horizontal displacement between the X-ray tube and the movable holder of the small plate.

9. A method of X-ray photography comprising the steps of taking an initial rough X-ray picture of larger size than the desired final picture, developing said initial picture while the subject remains posed, determining the localization and centering of the interesting portion of the subject and the time of exposure and density of the negative from the initial picture, supporting a plate for a smaller sized picture in a determined position relatively to an X-ray tube and the subject, supporting the initial picture, and adjusting the plate for the smaller picture relatively to the initial picture to bring the plate for the smaller picture into position for taking a picture of the subject corresponding to a localized area of the initial picture.

CLEMENT SYLVAIN CHAUSSÉ.